United States Patent

[11] 3,566,935

| [72] | Inventor | Keldon W. Wilds<br>1440 N.W. 49, Oklahoma City, Okla. 73118 |
|---|---|---|
| [21] | Appl. No. | 753,219 |
| [22] | Filed | Aug. 16, 1968 |
| [45] | Patented | Mar. 2, 1971 |

[54] TREE FELLING AND CUTTING APPARATUS
5 Claims, 7 Drawing Figs.

[52] U.S. Cl. ................................................ 144/34
[51] Int. Cl. ................................................ A01g 23/02
[50] Field of Search ........................................ 144/2 (21), 3 (4), 34, 34 (1—6), 309 (34)

[56] References Cited
UNITED STATES PATENTS

| 2,751,943 | 6/1956 | Ford | 144/34 |
| 2,876,816 | 3/1959 | Busch et al. | 144/309 |
| 2,981,301 | 4/1961 | Busch et al. | 144/3 |

FOREIGN PATENTS

| 139,716 | 12/1950 | Australia | 144/34 |
| 908,790 | 4/1954 | Germany | 144/34 |

Primary Examiner—Gerald A. Dost
Attorney—Robert K. Rhea

ABSTRACT: A two-wheel trailer frame is provided with a laterally extending arm structure having a tree bowl receiving socket. Oppositely disposed blades are movable toward and away from each other across the socket. Hydraulic power supply means is mounted on the trailer and arm structure for raising and lowering the arm and reciprocating the blades.

KELDON W. WILDS
INVENTOR.

BY
Robert K. Rhea
AGENT

PATENTED MAR 2 1971
3,566,935
SHEET 2 OF 2
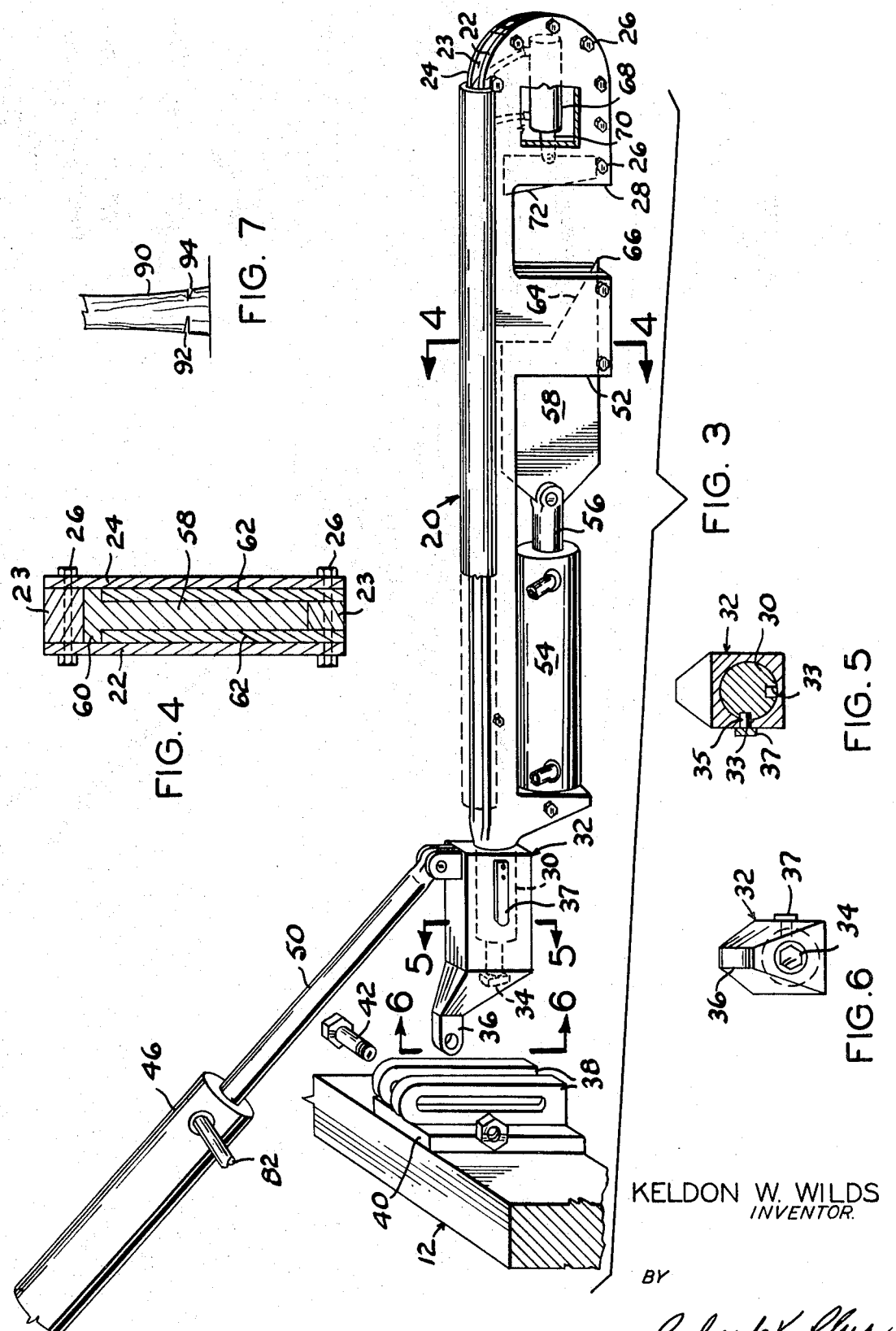
KELDON W. WILDS
INVENTOR.
BY
Robert K. Rhea
AGENT

TREE FELLING AND CUTTING APPARATUS

BACKGROUND OF THE INVENTION

The present invention relates to wood cutting and more particularly to a hydraulically powered apparatus for felling and cutting trees in selected lengths.

Clearing trees off of land or harvesting trees to form firewood usually require a sequence of various operations involving the use of a number of tools such as axes, hand saws, manually manipulated power saws, and the like. This procedure obviously requires a considerable amount of manual labor. In order to reduce the amount of manual labor, particularly in harvesting trees to be later sawed into lumber, various tree harvesting machines have been heretofore proposed but such machines are relatively large and expensive and, therefore, are not practical for the use of a small operator in clearing land or felling relatively small trees for firewood.

This invention provides a power driven apparatus which is supported by a two-wheel trailer frame which may be positioned for felling firewood producing trees having a bowl diameter on the order of eight inches or less. After a tree has been felled it is necessary that branches be trimmed off and the tree is then transversely cut into stove or fireplace lengths. Accordingly, this apparatus is arranged for engaging and severing a felled tree into selected lengths.

SUMMARY OF THE INVENTION

A two-wheel trailer frame is provided with a laterally extending pivotally connected arm structure having a tree bowl receiving socket adjacent its free end. Hydraulic cylinders, mounted on the arm, reciprocate oppositely disposed blades into and out of the tree receiving socket. A hydraulic lift cylinder, supported by the trailer frame, maintains the free end of the arm at a selected position with respect to the surface of the earth. An engine driven hydraulic pump and control panel, mounted on the trailer, operate the hydraulic cylinders. A hydraulic adjusting cylinder, connected with the trailer frame and its tow hitch, pivots the trailer about a vertical axis through one of its wheels for moving the arm socket into tree bowl engaging position. Thus, this apparatus may be towed behind a pickup truck, or the like, and easily positioned adjacent a tree to be felled.

The principal object of this invention is to provide a self-contained two-wheel trailer unit having a tree shearing device that may both fell a standing tree and then cut it into selected lengths which is operated by power means carried by the trailer.

BRIEF DESCRIPTION OF THE DRAWINGS

FIG. 3 is an exploded fragmentary perspective view, to a larger scale, illustrating the arm structure and the manner of connecting it to the trailer frame;

FIG. 4 is a vertical cross-sectional view, to a different scale, taken substantially along the line 4—4 of FIG. 3;

FIG. 5 is a vertical cross-sectional view taken substantially along the line 5—5 of FIG. 3;

FIG. 6 is an end elevational view looking in the direction of the line 6—6 of FIG. 3; and FIG. 7 is a fragmentary elevational view of a tree illustrating the manner of felling a tree.

DESCRIPTION OF THE PREFERRED EMBODIMENT

Figure 1:
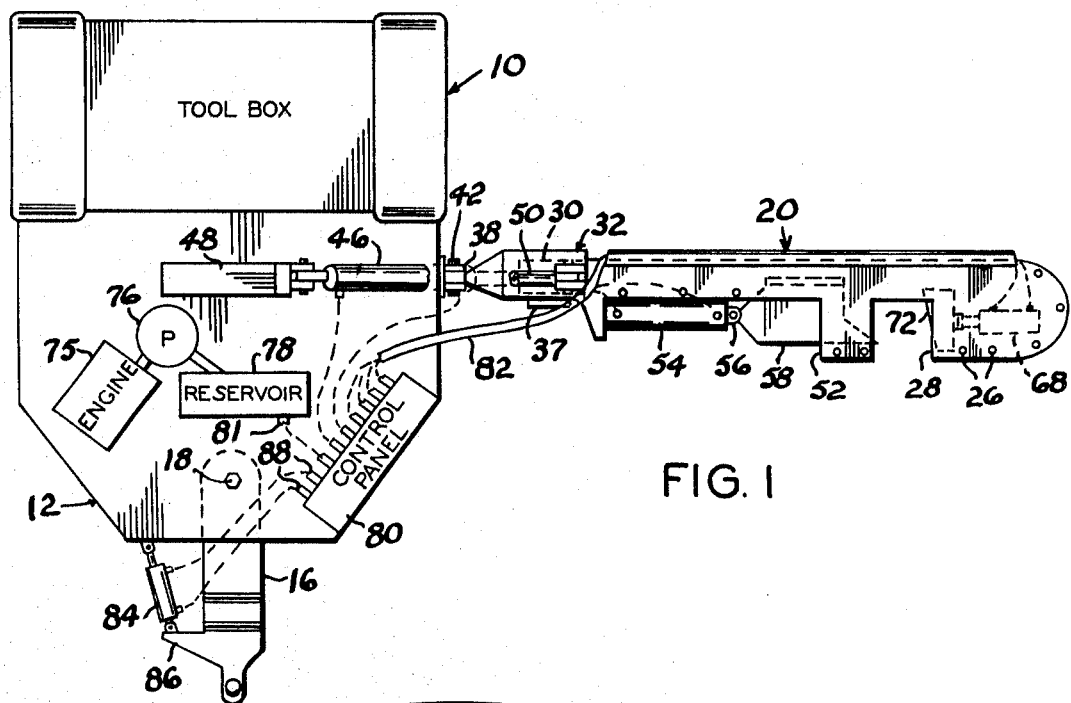
FIG. 1 is a top plan view of the device with parts broken away for clarity.

Like characters of reference designate like parts in those figures of the drawings in which they occur.

In the drawings:

The reference numeral 10 indicates a substantially conventional two-wheeled trailer having a frame 12 supported by wheels 14 and 15 journaled by an axle, not shown, connected with the frame. The trailer frame is provided with a trailer hitch-equipped forwardly extending tongue 16 pivotally connected, as at 18, to the trailer frame for horizontal pivoting movement for the purposes presently explained.

The numeral 20 indicates an elongated tree felling and cutting arm structure extending laterally of the trailer 10. The arm structure 20 is formed by a plurality of superposed plate members 22, 23 and 24 which are interconnected in flat face to face relation by a plurality of bolts and nuts 26. Each of the plates 22—24 are notched to form a rectangular tree bowl receiving slot 28. One end portion of the assembled plates are connected with a cylinderlike portion 30 journaled by a rectangular support block 32 and held therein by a stud bolt 34 (FIGS. 3 and 6) for rotation of the arm structure about the longitudinal axis of the member 30. The periphery of the cylinder 30 is provided with 90° spaced slots 33 (FIG. 5) for receiving an indexing pin 35 secured to one end of a support block mounted spring lever 37 through a cooperating hole in the support block wall for reasons presently explained.

Figure 2:
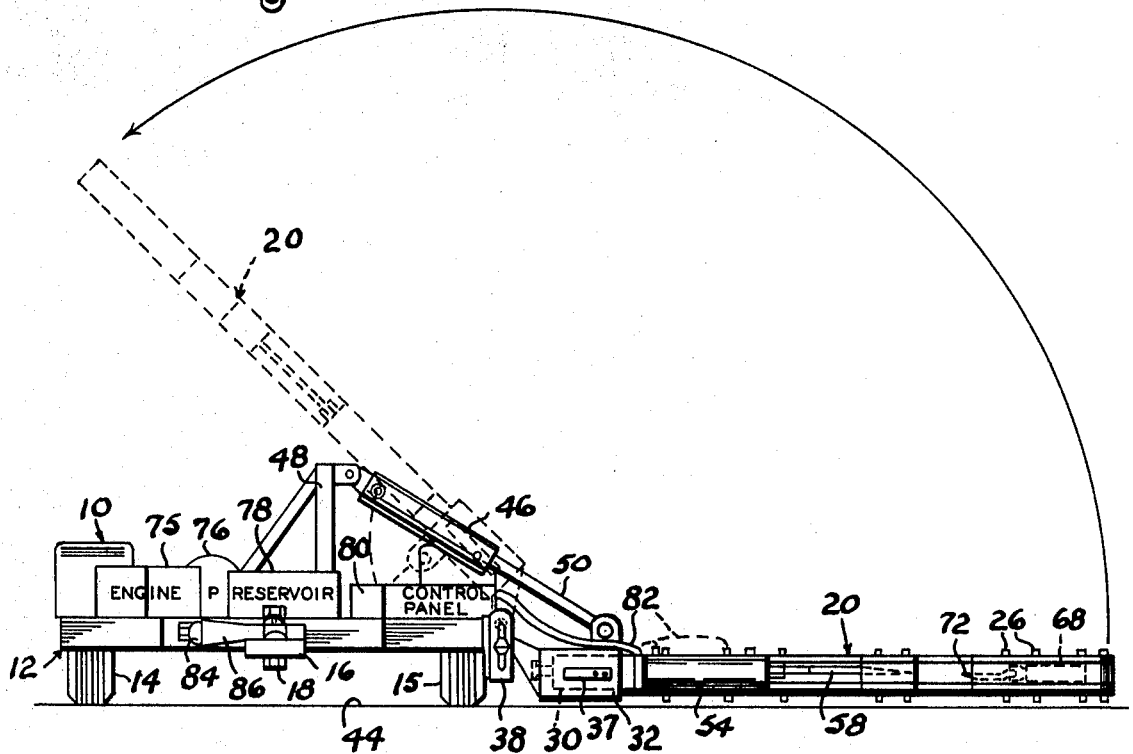
FIG. 2 is a front elevational view of FIG. 1 illustrating, by dotted lines, the folded transporting position of the arm structure.

The end portion of the block 32, projecting toward the trailer converges upwardly and outwardly toward the trailer frame terminating in a transversely bored ear 36 which is cooperatively received between a pair of parallel vertically slotted brackets 38 secured to a plate 40 attached to the frame 12. A bolt 42 extends transversely through the slots in the brackets 38 and the apertured ear 36 thus pivotally connecting the arm 20 to the frame 12 for vertical pivoting movement of the free end of the arm about the horizontal axis formed by the bolt 42. The purpose of the slots in the brackets 38 is to permit vertical horizontal adjustment of the arm with respect to the earth surface, indicated by the line 44 (FIG. 2).

A hydraulic lifting cylinder 46 is pivotally connected at one end to a post 48 mounted on the upper surface of the trailer frame 12. The free end of the piston 50, of this hydraulic cylinder, is pivotally connected, in a conventional manner, to the block 32 for raising and lowering the free end portion of the arm 20 for the reasons hereinafter explained.

One side edge of the arm 20 is longitudinally recessed or notched, as at 52, for receiving a hydraulic shear cylinder 54 having the free end of its piston rod 56 connected to one end of a platelike shearing blade, indicated generally at 58. The blade 58 is interposed between the outer arm structure plates 22 and 24 to achieve longitudinal sliding movement into and out of the tree receiving slot 28. The blade 58 is characterized by a T-shaped edge portion 60 sliding in a T-shaped slot formed by the plates 22, 23 and 24 and a pair of spacers 62 (FIG. 4). The end portion of the blade 58 opposite the piston rod 56 terminates in a sharpened and beveled cutting edge 64 with its tip or pointed end 66 of the blade disposed adjacent the open end of the slot 28 so that the beveled edge 64 forms a wedging action against the bowl of a tree when positioned within the slot 28 as hereinafter explained.

The free end portion of the arm 20 has its center plate 23 hollowed out or cut away for receiving a hydraulic notching cylinder 68 having its piston rod 70 connected with a notching blade 72 similarly slidably interposed between the arm plates 22 and 24 for movement into and out of the tree receiving slot 28 opposite the blade 58. The notching blade 72 is characterized by a beveled sharpened edge facing toward the open side of the slot 28.

As shown more clearly in FIG. 2, the depending surface of the blade 58 and upper surface of the notching blade 72 lie in a common plane so that the cutting edge 64 of the blade 58 slidably overlies the upper surface of the notching blade 72 when the blade 58 is extended across the tree receiving slot 28 to insure that a tree therein will be severed.

Referring now more particularly to FIGS. 1 and 2, an engine 75 is mounted on the upper surface of the frame 12 and is drivably connected with a hydraulic pump 76 in turn connected with a hydraulic fluid reservoir 78. The reservoir 78 is connected with a control panel 80 mounted on the frame 12 by flexible tubing 81. Other tubing 82, connected with the control panel, are respectively connected with the respective hydraulic cylinders 46, 54 and 68 in a conventional manner.

A hydraulic adjusting cylinder 84 extends between and is pivotally connected with a laterally extending wing 86 secured to the forward end portion of the tongue 16 and a forward end portion of the trailer frame laterally of its longitudinal centerline. Other tubing 88 similarly connects the adjusting cylinder 84 to the control panel.

OPERATION

In operation the device is towed behind a suitable vehicle, not shown, and with the arm 20 extending horizontally of the trailer frame the slot 28 is positioned in tree bowl receiving position. The horizontal position of the arm 20, with respect to the earth's surface 44, is adjusted by the bolt 42 to cut a tree as close to the earth as the terrain will permit. Obviously it will be difficult to stop the towing vehicle with the tree slot 28 fully encompassing the tree bowl, therefore, the slot is aligned as close as is easily achieved with the tree bowl. The hydraulic adjusting cylinder 84 is then actuated by its valve on the control panel 80 so that the trailer frame 12 is horizontally rotated about a vertical axis extending through the trailer wheel 15 which moves the free end of the arm 20 toward the tree to position the slot in enveloping relation around the tree bowl.

The notching cylinder 68 is operated to force the notching blade 72 into that side of the tree bowl 90 (FIG. 7) opposite the trailer. The blade 72 is then retracted from engagement with the tree and the shearing cylinder 54 actuated to move the shearing blade 58 against the tree which severs the tree. Since the cut 92, formed by the shearing blade, is spaced slightly above the position of the notch 94, formed on the opposite side of the tree, the tree tends to fall away from the trailer.

The tree is then cleared of its branches and positioned in longitudinal parallel spaced relation with respect to the trailer for severing the tree into selected lengths. The arm 20 is rotated about the longitudinal axis of the cylinder 30 so that its slot 38 opens downwardly. The hydraulic cylinder 46 is operated to lift the free end of the arm 20 to position the tree under the slot 28. The arm 20 is then lowered by the cylinder 46 so that the slot surrounds the tree and the cutting cycle is then repeated for severing the tree. Small bowl trees may be severed or cut without using the notching blade.

When transporting the device down a highway the cylinder 46 and its piston 50 are disconnected from the post 48 and the block 32 and the free end of the arm 20 is pivoted upwardly to its dotted line position of FIG. 2 angularly overlying the trailer 10.

Obviously the invention is susceptible to some change or alteration without defeating its practicability and I therefore do not wish to be confined to the preferred embodiment shown in the drawings and described herein.

I claim:

1. In combination with a trailer having a frame and having a forwardly projecting tongue, the improvement comprising:
   a tree cutting apparatus including a generally horizontally disposed elongated arm structure extending laterally of said frame, said arm structure having a tree receiving slot adjacent its end opposite said frame;
   a centrally bored support block longitudinally journaling the end portion of said arm structure adjacent said frame, said block having a transversely apertured ear projecting longitudinally toward said frame;
   a pair of spaced-apart vertically slotted brackets vertically secured to one side of said frame for receiving said ear therebetween;
   a bolt projecting horizontally through the bracket slots and said ear for vertical movement of said ear with respect to said brackets and vertical pivoting movement of the free end portion of said arm structure about the axis of said bolt;
   a blade reciprocably supported by said arm structure on respective opposing sides of the tree receiving slot;
   fluid pressure responsive cylinders mounted on said arm structure and connected with said blades for reciprocating the latter; and
   fluid pressure generating means mounted on said trailer and connected with said fluid pressure responsive cylinders.

2. Structure as specified in claim 1 in which one end of one said blade terminates in a beveled cutting edge facing toward the inner limit of the tree receiving slot for impinging and severing a tree disposed therein.

3. Structure as specified in claim 2 and further including a hydraulic lift cylinder extending between and operatively connected with said frame and said block for raising and lowering the free end portion of said arm structure.

4. Structure as specified in claim 3 and further including a fluid pressure responsive adjusting cylinder extending between a lateral side of said tongue and a forward portion of said trailer for partially rotating said trailer about a vertical axis.

5. Structure as specified in claim 4 in which said pressure generating means includes a pump, an engine drivably connected with said pump, and valve and tubing means connecting said pump with each said hydraulic cylinder.